(12) United States Patent
Banerjee et al.

(10) Patent No.: US 8,448,245 B2
(45) Date of Patent: May 21, 2013

(54) AUTOMATED IDENTIFICATION OF PHISHING, PHONY AND MALICIOUS WEB SITES

(75) Inventors: Anirban Banerjee, Riverside, CA (US); Michail Faloutsos, Riverside, CA (US)

(73) Assignee: Stopthehacker.com, JAAL LLC, Riverside, CA (US)

( * ) Notice: Subject to any disclaimer, the term of this patent is extended or adjusted under 35 U.S.C. 154(b) by 432 days.

(21) Appl. No.: 12/689,986

(22) Filed: Jan. 19, 2010

(65) Prior Publication Data

US 2010/0186088 A1 Jul. 22, 2010

Related U.S. Application Data

(60) Provisional application No. 61/205,261, filed on Jan. 17, 2009.

(51) Int. Cl.
*G06F 11/00* (2006.01)
(52) U.S. Cl.
USPC ............... 726/22; 726/23; 726/24; 726/25; 726/27; 715/38; 715/234; 709/224; 709/225
(58) Field of Classification Search
USPC ............. 726/22, 23, 24, 25, 27; 715/38, 234; 709/224, 225
See application file for complete search history.

(56) References Cited

U.S. PATENT DOCUMENTS

| | | | |
|---|---|---|---|
| 6,092,194 A | 7/2000 | Touboul | |
| 6,154,844 A | 11/2000 | Touboul | |
| 6,167,520 A | 12/2000 | Touboul | |
| 6,480,962 B1 | 11/2002 | Touboul | |
| 6,804,780 B1 | 10/2004 | Touboul | |
| 6,922,693 B1 | 7/2005 | Rubin et al. | |
| 6,944,822 B1 | 9/2005 | Schreiber et al. | |
| 6,965,968 B1 | 11/2005 | Touboul | |
| 6,993,662 B2 | 1/2006 | Rubin et al. | |
| 7,058,822 B2 | 6/2006 | Edery et al. | |
| 7,076,469 B2 | 7/2006 | Schreiber et al. | |
| 7,155,743 B2 | 12/2006 | Goodman et al. | |
| 7,155,744 B2 | 12/2006 | Schreiber et al. | |
| 7,185,358 B1 | 2/2007 | Schreiber et al. | |
| 7,257,630 B2 | 8/2007 | Cole et al. | |
| 7,281,272 B1 | 10/2007 | Rubin et al. | |
| 7,299,361 B1 | 11/2007 | Kim et al. | |
| 7,302,706 B1 | 11/2007 | Hicks et al. | |

(Continued)

OTHER PUBLICATIONS

Cisco, "IronPort Web Reputation Filters," IronPort S-Series, 4 pages, printed in year 2012.

(Continued)

*Primary Examiner* — Thuong Nguyen

(57) ABSTRACT

A method and system for automated identification of phishing, phony, and malicious web sites are disclosed. According to one embodiment, a computer implemented method, comprises receiving a first input, the first input including a universal resource locator (URL) for a webpage. A second input is received, the second input including feedback information related to the webpage, the feedback information including an indication designating the webpage as safe or unsafe. A third input is received from a database, the third input including reputation information related to the webpage. Data is extracted from the webpage. A safety status is determined for the webpage, including whether the webpage is hazardous by using a threat score for the webpage and the second input, wherein calculating the threat score includes analyzing the extracted data from the webpage. The safety status for the webpage is reported.

25 Claims, 15 Drawing Sheets

U.S. PATENT DOCUMENTS

| | | | |
|---|---|---|---|
| 7,308,712 B2 | 12/2007 | Banzhof | |
| 7,389,539 B1 | 6/2008 | Kouznetsov | |
| 7,409,720 B1* | 8/2008 | Cambridge et al. | 726/24 |
| 7,418,731 B2 | 8/2008 | Touboul | |
| 7,428,592 B2 | 9/2008 | Lee et al. | |
| 7,496,960 B1 | 2/2009 | Chen et al. | |
| 7,562,304 B2* | 7/2009 | Dixon et al. | 715/738 |
| 7,613,918 B2 | 11/2009 | Ben-Itzhak | |
| 7,613,926 B2 | 11/2009 | Edery et al. | |
| 2006/0191012 A1* | 8/2006 | Banzhof et al. | 726/25 |
| 2006/0253584 A1* | 11/2006 | Dixon et al. | 709/225 |
| 2007/0186282 A1* | 8/2007 | Jenkins | 726/22 |
| 2007/0192855 A1* | 8/2007 | Hulten et al. | 726/22 |
| 2008/0047016 A1* | 2/2008 | Spoonamore | 726/25 |
| 2008/0082662 A1* | 4/2008 | Dandliker et al. | 709/225 |
| 2008/0092242 A1* | 4/2008 | Rowley | 726/27 |
| 2008/0189408 A1* | 8/2008 | Cancel et al. | 709/224 |
| 2008/0189788 A1* | 8/2008 | Bahl | 726/25 |
| 2009/0070873 A1* | 3/2009 | McAfee et al. | 726/23 |
| 2009/0327084 A1* | 12/2009 | Patton et al. | 705/14.73 |
| 2009/0328209 A1* | 12/2009 | Nachenberg | 726/22 |

OTHER PUBLICATIONS

Klanke, "Why Blacklist Destinations?," located at http://aggressivevirusdefense.wordpress.com/2009/04/19/why-blacklist/, printed on Oct. 20, 2012, 5 pages.

Hacquebord, Feike, "Investigations on a Cybercrime Hub in Estonia," Malware Blog, TrendMicro, located at http://blog.trendmicro.com/trendlabs-security-intelligence/investigations-on-a-cyber-crime . . . , printed on Oct. 20, 2012, 4 pages.

* cited by examiner

AUTOMATED IDENTIFICATION OF PHISHING, PHONY AND MALICIOUS WEB SITES

The present application claims the benefit of and priority to U.S. Provisional Patent Application No. 61/205,261 entitled "AUTOMATED IDENTIFICATION OF PHISHING, PHONY, AND MALICIOUS WEB SITES" filed on Jan. 17, 2009, and is hereby incorporated by reference.

FIELD

The field of the invention relates generally to computer systems. In particular, the present method and system are directed to automated identification of phishing, phony, and malicious web sites.

BACKGROUND

In the field of computer security, phishing is the criminally fraudulent process of attempting to acquire sensitive information such as usernames, passwords and credit card details by masquerading as a trustworthy entity in an electronic communication. Communications purporting to be from popular social web sites, auction sites, online payment processors or IT administrators are commonly used to lure the unsuspecting public. Phishing is typically carried out by e-mail or instant messaging, and it often directs users to enter details at a fake website whose look and feel are almost identical to the legitimate one. Even when using server authentication, it may require tremendous skill to detect that the website is fake.

SUMMARY

A method and system for automated identification of phishing, phony, and malicious web sites are disclosed. According to one embodiment, a computer implemented method, comprises receiving a first input, the first input including a universal resource locator (URL) for a webpage. A second input is received, the second input including feedback information related to the webpage, the feedback information including an indication designating the webpage as safe or unsafe. A third input is received from a database, the third input including reputation information related to the webpage. Data is extracted from the webpage. A safety status is determined for the webpage, including whether the webpage is hazardous by using a threat score for the webpage and the second input, wherein calculating the threat score includes analyzing the extracted data from the webpage. The safety status for the webpage is reported.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

Figure 1:
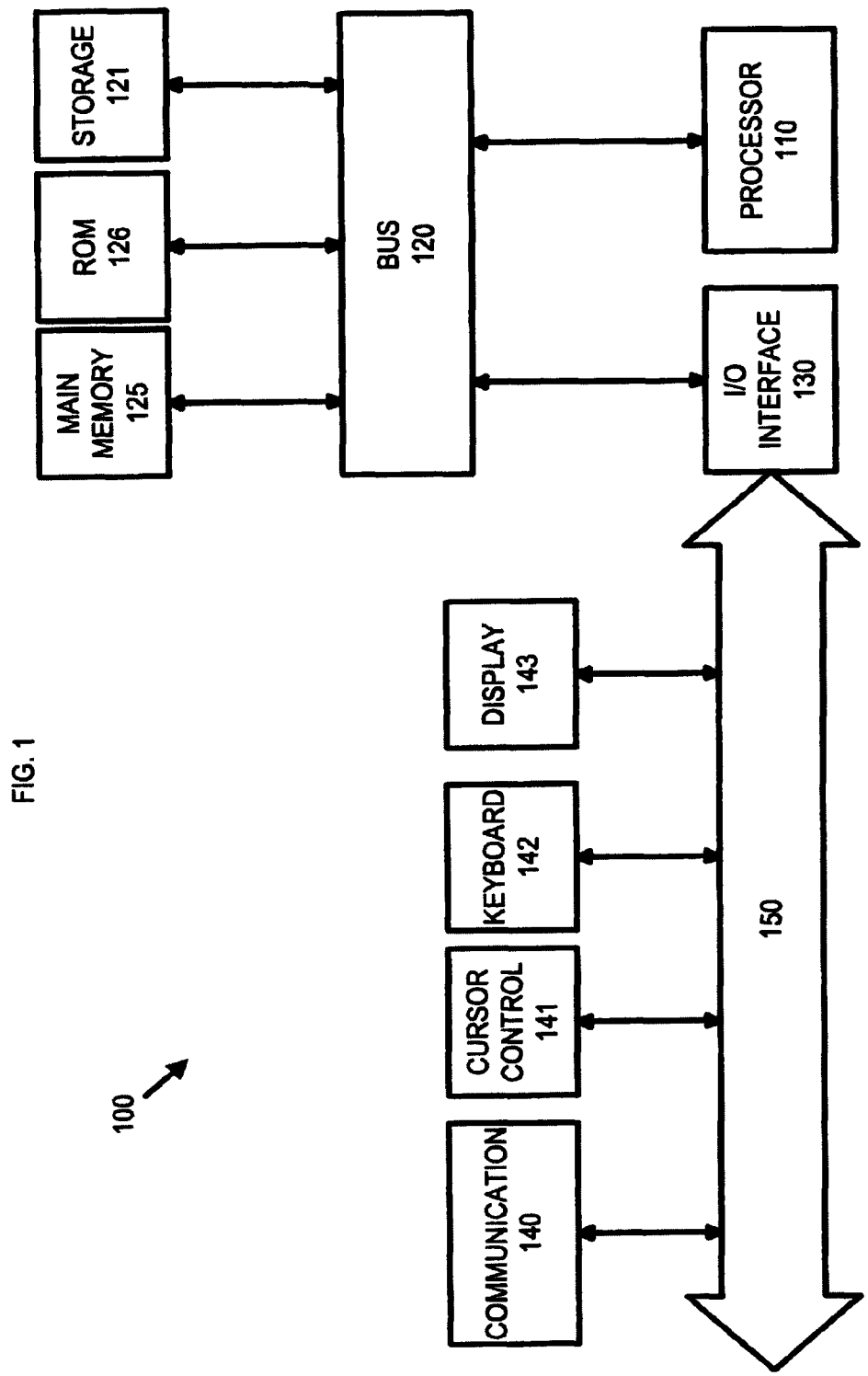
FIG. 1 illustrates an exemplary computer architecture for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A method and system for automated identification of phishing, phony, and malicious web sites are disclosed. According to one embodiment, a computer implemented method, comprises receiving a first input, the first input including a universal resource locator (URL) for a webpage. A second input is received, the second input including feedback information related to the webpage, the feedback information including an indication designating the webpage as safe or unsafe. A third input is received from a database, the third input including reputation information related to the webpage. Data is extracted from the webpage. A safety status is determined for the webpage, including whether the webpage is hazardous by using a threat score for the webpage and the second input, wherein calculating the threat score includes analyzing the extracted data from the webpage. The safety status for the webpage is reported.

The present method and system assess the safety and suitability of a website by analyzing the site along multiple dimensions (i.e., with respect to a plurality of different parameters). The present system protects web-surfing users, protects the reputation of online business, and assesses the degree of similarity, intentional or not, between websites. Undesirable websites include but are not limited to websites that attempt to commit ID-theft or infect the computer of the user with viruses and malware. The present system can be used in a plurality of ways including those to: (a) make web-surfing safer by advising the user about the potential hazard of going to rogue websites, (b) protect the reputation of a website by detecting and pinpointing unsafe parts which have been injected by a malicious attacker or an unsafe web advertisement (distributed via a web advertisement company) without the knowledge of the web-site owner, (c) classify, rank and filter websites, e.g. as part of a search engine or as a means of analyzing and safeguarding the web, and (d) assess the degree of typosquatting, i.e. websites that use names similar to that of a given website.

The present system includes multiple software modules that work in parallel and cooperatively to classify websites according to their characteristics. The characteristics include those of undesirability, vulnerability to being hacked, and threat level. Based on the information, the web-surfer can make an informed decision so as to avoid potentially harmful websites, while a web-site owner can take action to sanitize the web-site. Each module of the present system analyzes features of a website and generates a threat report or score. The threat reports are collected and a weighted score is computed from the individual scores. The feedback is returned to the user of the proposed system at the appropriate level in a customizable way. For example, the threat level can be an easy to understand visual cue, such as a colored button, for a web-surfer, or it can be a detailed report identifying the specifics of the threat for a web-site owner, or identifying an unsafe web advertisement.

The present system includes a tool to protect users and businesses from damage inflicted by rogue web-sites. Rogue web-sites can be defined as those that engage in URL-fraud, defined below. URL-fraud is integral to Internet threats and cyber-crime. The present system can identify such sites and protect users from visiting them or inform web-site owners that their sites have been compromised and turned into dangerous sites.

The present system comprises modules that analyze different aspects of a website, and combine the results of the separate analyses to assess the safety of a web-site and to pinpoint an exact problem within a website. The present system can be used to assess the safety of and compare websites, and to analyze the "neighborhood" in terms of name-string proximity of a website.

The present system determines whether a given website is safe or not. The present system analyzes a website and classifies it along several dimensions of danger and concerns, which include the likelihood of:

compromising the computer of the user,
conducting identity theft or financial-level misbehavior,
annoying behavior, such as customer redirection away from the desired site,
displaying an unsafe web advertisement, and
exposure to undesirable or inappropriate content.

The level that the user wants to be "protected" can depend on her expertise and confidence in her abilities. Similarly, what constitutes appropriate web-content is specific to the user and the environment. For example, in an enterprise setting, access to a sports-news portal like espn.com may be deemed inappropriate.

Note that the term "website" is often used to mean one of the following.
(a) the name of the website as a string of characters (e.g. the domain name),
(b) all the pages that "hang" under the same domain name, or
(c) the first page that is returned when a website name is given to a web-browser.

The present description refers to URLs and hyperlinks, and it is noted that the terms may be used interchangeable. Conventions and definitions used throughout this document include the following.

Conventions

A: The article 'a' is not meant to limit the present system to the example given but rather allow a plurality of alternatives.

Including: introduces one or more examples of its antecedent, and such examples are not exclusive or preclusive of additional examples, i.e., it is understood as "including without limitation."

Definitions

Phishing: Pronounced "fishing." Also known as carding or brand-spoofing and is defined as the process of forging communications methods such as email to a recipient, falsely mimicking, a legitimate establishment in an attempt to scam the recipient into divulging private information such as credit card numbers, bank account login details.

Pharming: Pronounced "farming." Defined as a hacker's attack aiming to redirect the traffic intended for a particular website to a different, unintended website. Pharming can be conducted either by changing the host's file on a victim's computer or by exploitation of a vulnerability in Domain Name System (DNS) server software.

Undesirable websites can be grouped according to their role and function as follows.

Typosquatting or URL hijacking sites: An entity registers a website name similar to that of a popular site in order to "poach" the users who mistype the name. For example, goole.com prompts users to query ask.com a direct competitor of google.com.

Phishing, pharming, and identity theft sites: Often enabled by email spam, which contains hyperlinks to web-pages that attempt to steal the users identity. The email and the sites usually masquerade as financial institutions and use clever techniques to coerce the user, e.g. "Your checking account will be frozen unless you act immediately".

Virus-propagating sites: Bogus sites that are created to contaminate the computers of users that visit them. Such sites can also use email spam to attract users.

Code-injection sites: Legitimate sites that themselves have been compromised and behave like virus propagation sites without the knowledge of their owner, or that display unsafe web advertisements.

Sites with undesirable or offensive content: Sites use typosquatting, as described above, to "push" undesirable content to unsuspecting users. An example is dosney.com, which ultimately leads to an adult content site, in stark contrast to the intended site disney.com.

The term "rogue" is used to describe all of the above undesirable sites whose behavior ranges from annoying to malicious and dangerous. Note that the meaning of rogue can vary according to the application, the environment, and the user specifications and the context. The present system provides a fine-grained distinction between rogue sites and enhanced user control over. The term 'rogue' is used in its general sense, and the term malicious is used to refer specifically to sites that either engage in identity theft or spread viruses.

The present system provides an efficient system and method to identify rogue websites. The present system is capable of being integrated into current software systems such as email clients or servers, web-browsers, search-engine mechanisms. It can also form the basis of a stand-alone tool that can assess the safety of a web-site.

The present system allows individual users to customize and implement the level of security they each require and the level of detail to which they desire to be informed with regard to the security status of a website.

The present system allows for tunable, adaptive, and customizable operation of the software modules according to factors including user behavior, feedback, and user requirements.

The present system can identify rogue websites and pinpoint the specific vulnerabilities or threats, including malicious code and its location in the website or linked websites. The present system consists of a two-level modular architecture. The modules at the first level use profiles (defined later) of known rogue sites to classify a given website. The second level module combines the answers from the separate first level modules' results and suggests a final answer, score, or other measure of safety.

According to one embodiment, users can specify blacklists of sites, or online/offline databases, which can be used by the present system to improve their accuracy in the detection of undesirable and compromised sites.

It is an advantage of the present system that it allows users to protect themselves from rogue sites in an online fashion, namely as the user browses the web. Embodiments include but are not limited to the following.

(1) light-weight, for real-time detection for when a user is on-line browsing from a computer or handheld device
(2) Medium-weight for off-line analysis on resource-limited devices such as laptops, and
(3) slow for more thorough offline classification and analysis of websites by more powerful machines, such as desktops.

The present system is fine-grained and customizable. A customizable and bidirectional communication is established between the user and the present system. In contrast to previous tools, the user is able to obtain a fine-grained classification and an intuitive explanation of the type of the potential danger. At the same time, the user can tailor the operation to her needs.

The present system may be used in many different ways including but not limited to the following:
- to make web-surfing safer by advising the user to not go to dangerous websites,
- to protect the reputation of a website by detecting and pinpointing unsafe parts which have been injected by a malicious attacker without the knowledge of the web-site owner, and
- to classify, rank and filter websites, e.g. as part of a search engine or as a way to analyze the web.

According to one embodiment, the present system is integrated in web browsers, mail clients, mail servers, firewalls, on desktops, laptops, servers and handhelds. According to one embodiment, the present system operates as a stand-alone piece of software that the user or an application can query. According to another embodiment, the present system is integrated within another piece of software, (e.g. a plug-in for a browser, a firewall, or a web-access filtering system).

According to one embodiment, the present system is a software service that is offered by the owner of a software tool to web-site owners desiring detailed information on the health and vulnerabilities of their respective websites.

The present system determines if two web-sites are "similar" in content, functionality, or appearance. For example, a user may want to identify whether citibonk.com is trying to imitate citibank.com or it is a completely different business that happens to have a similar name.

Another object of the present system is to assess the problem of typosquatting for a given website. According to one embodiment, given a website name (whether in use or under consideration before use) the present system provides a detailed report which includes: (a) a list of all possible similar names with 1 to k letter variations, where k is a user defined parameter, and variations include additions, removal, and substitutions of letters in the name; (b) a list of all registered and non registered names among that set of names; and (c) a classification of the registered names as: legitimate or incidentally similar and the type of business they are in, or as rogue web-sites and the type of threat they represent, including malware spreading, identity-theft, and parked domains (parked domains are domain names that are registered, but they do not point to a specific site, but instead point to a dynamically created site).

According to one embodiment, the system is centralized and run from one machine.

According to one embodiment, the present system is distributed and operates via communication between a main location in collaboration with a software agent that runs on a client machine. According to one embodiment, the software agent is a thin-client that only queries the main location. In another embodiment, the software agent is executing part of the system described herein, and communicates with the main location to receive and report information.

In another embodiment, the system includes a specialized computing device (often referred to as an "appliance" or "apparatus") that is connected to a networking infrastructure and with some infrequent synchronization with the main location to update the information and the software of the appliance.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2:
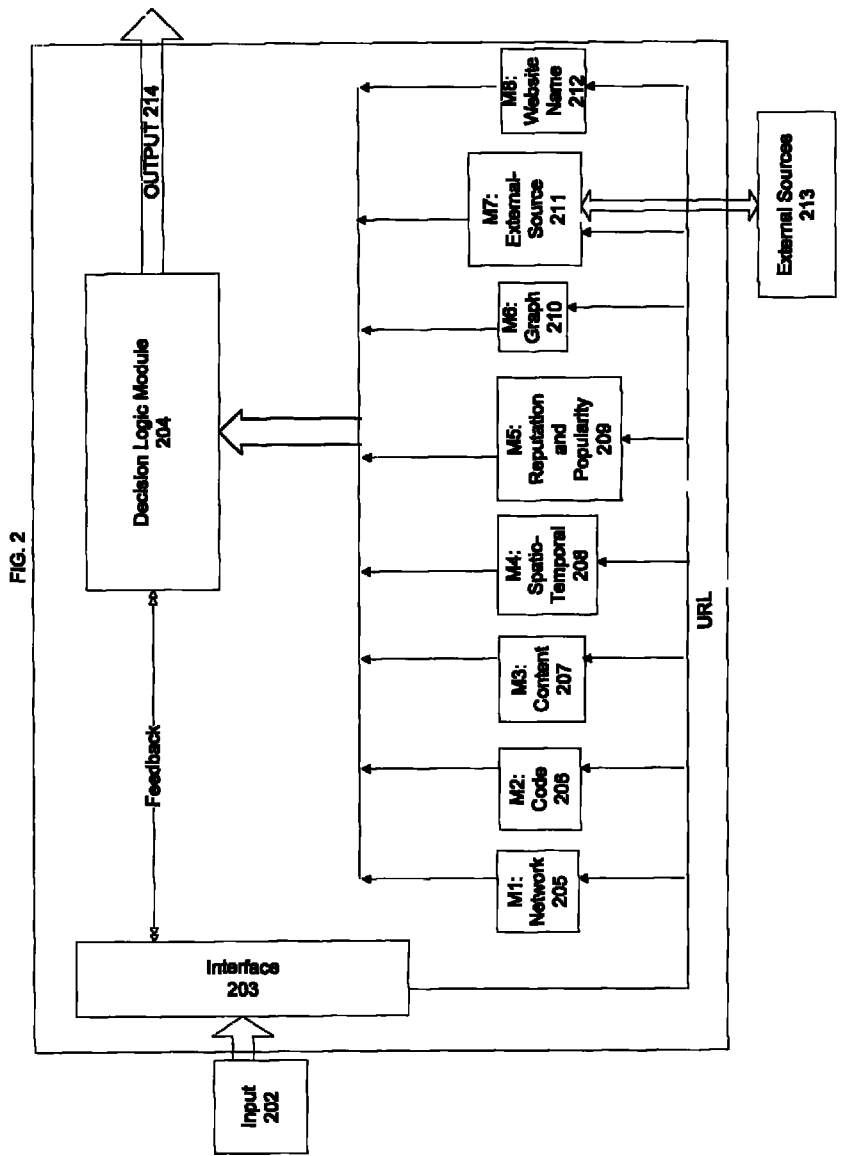
FIG. 2 illustrates an exemplary system architecture for use with the present system, according to one embodiment.

FIG. 2 illustrates an exemplary system architecture for use with the present system, according to one embodiment. Input 202 can be in the form of one or more website names (URLs). The input websites can be provided in a plurality of ways including: (a) by the user typing, (b) by the user clicking on a hyperlink, (c) as the address of a page the user is currently visiting, (d) by the user moving the mouse pointer on a link in the current web page, (e) via a file that contains URLs, and (f) via an interface from another software process that is executed by the same device or a remote device that performs a software process and communicates with the present system. The input 202 is captured through an interface module 203 and transfers the website name to the analysis modules included in the system. According to one embodiment, the user can specify whether the analysis should focus on the first page that the website name refers to or all the pages that "hang" under that web-site name.

Each module, Mi, analyzes an aspect of the website in an effort to classify it. According to one embodiment, the present system includes the following modules that are described in greater detail later in this document:

M1 Network-based profile 205: This module measures network performance and behavioral issues, such as the number of http redirections that an http request will undergo until it is answered;

M2 Code-centric profile 206: This module detects code-injection attacks and malicious code in the page or within web advertisements;

M3 Content-based profile 207: This module analyzes content that includes keywords, the structure of the web-page, videos, images, and other web-elements;

M4 Spatio-temporal profile 208: This module captures temporal and spatial properties of the website, such as the geographical location, or the web-site registration date;

M5 Reputation and popularity profile 209: This module analyzes the collective belief and trust of the users;

M6 Graph-based profile 210: This module extracts information from the way web-pages point to each other;

M7 External-source module 211: This module collects and critically uses information from external sources 213 such as existing phishing databases; and M8 Web-site name profile 212: This module examines the name of the website as a string and we apply metrics that relate to string comparisons, examine the likelihood of a character replacing another, comparison with the name of the entity (e.g. company) that owns the site and such.

The present system is not limited to the above modules and types of profiles.

Partial answers or scores are developed from each module, and input to a decision logic module 204 that combines them along with user-specific preferences and prior history for a final answer or output 214 using machine learning and other techniques.

The decision logic module 204 and interface 203 cooperate in order to learn and adjust to the user preferences and behavior (this takes the form of reciprocal feedback). For example, a user can override the warning for a particular website, and stop the system from flagging it. The level at which the present system incorporates user-feedback is a tunable parameter. For example, in public or multi-user computers, it may be preferable for the present system to not change its behavior based on the user, who may have bad habits or poor judgment, in order to ensure high levels of protection.

The present system can be used to compare the profile of the website in question with: (a) typical profiles of websites in different classes (e.g. safe or unsafe) based on measurement studies and technical reports, (b) an earlier copy of itself, especially when this is used to assess the health of the website and pinpoint potential malicious and unauthorized modifications, as discussed in the introduction, and (c) a specific web-site, in order to quantify the similarity of the two sites in all or any of the specific profiles listed below (e.g. identify web-sites with similar content, similar structure or similar network behavior).

According to one embodiment, the present system repeats the execution of any of the modules Mi, including the code-centric module when deemed appropriate. As an example, in the case where the web object is a web advertisement, the code-centric module is repeated R times spaced out over a time interval D, where both R and D are user defined parameters. In each repetition, the threat score is recorded and all scores are provided to the decision logic module 204 for use in determining the final threat level.

Figure 3:
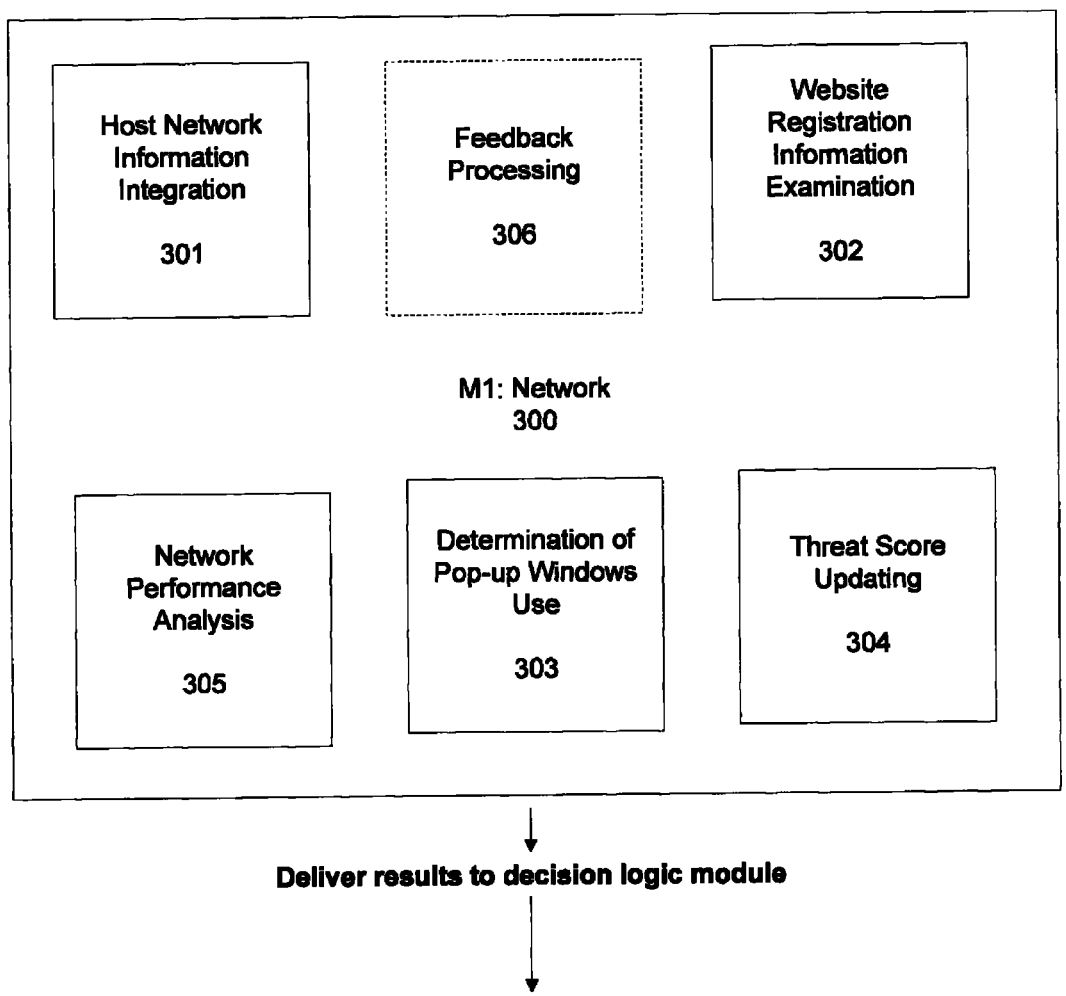
FIG. 3 illustrates an exemplary network module for use with the present system, according to one embodiment.

FIG. 3 illustrates an exemplary network module for use with the present system, according to one embodiment. A network based module 300 uses network performance and behavioral issues 305, such as the number of http redirections that an http request will undergo until it is answered. Properties utilized include but are not limited to http redirections, network performance characteristics, such as path and time delay and many others that an expert in the area could readily identify.

The network based module 300 integrates host network information 301 regarding the Autonomous Systems (AS) characteristics of a suspect site. Each website is hosted by an Internet Service Provider (ISP), which may be part of an Autonomous System (AS). This module can identify the AS's that own the ISP's that are used for hosting the suspect sites. Once this resolution has been achieved the module can compare the AS numbers (ASNs) with those that are present in the threat database which is part of the present system and can determine an overall threat score.

The network based module 300 also examines the legitimacy of the registered website 302 and the related IP address in use. According to one embodiment, publicly available repositories of information are queried, including but not limited to RIPE, ARIN, and WHOIS. If the website is not legitimately registered the threat score is increased.

The network based module 300 also determines if the site in question is attempting to use pop-up windows 303. A pop-up is a new browser window that opens up when visiting a site or can be part of the original web page itself. This can be achieved by using techniques such as floating frames. In case the pop-up does not spawn a separate window it is termed as an in-page advertisement. Pop-up windows containing advertisements are usually generated by JavaScript programs. The threat score for a web page is modified depending on the presence of a pop-up. Also, the content of the pop-up, including the link to where it is pointing to is analyzed and is used for modifying the individual threat score of this module. A threat score is updated 304 and the results are delivered to the decision logic module 204. The network module 300 also processes feedback received, if any, and uses the feedback in analysis.

Figure 4:
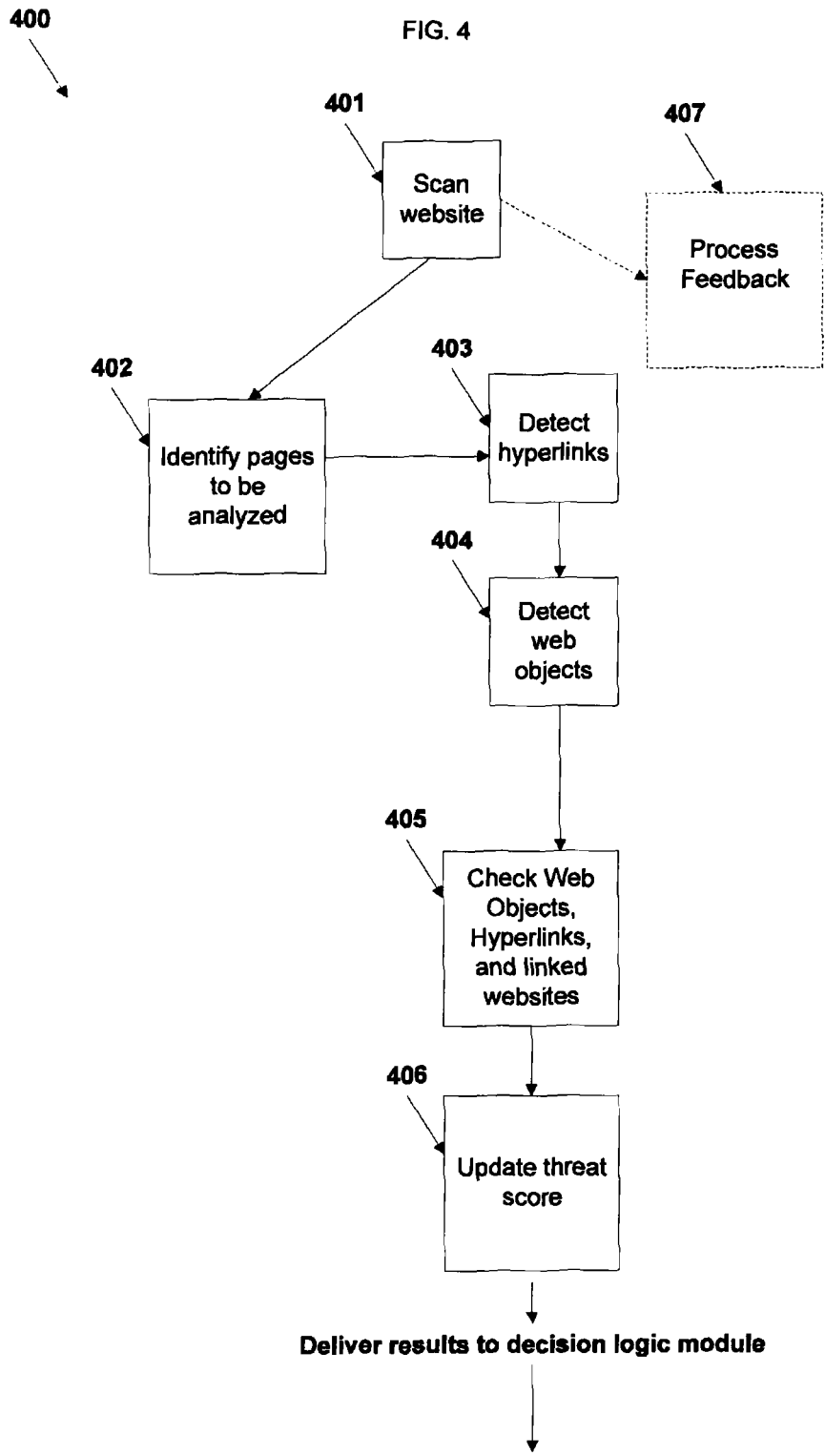
FIG. 4 illustrates an exemplary code-centric module for use with the present system, according to one embodiment.

FIG. 4 illustrates an exemplary code-centric module score process for use with the present system, according to one embodiment. A code centric module score process 400 analyzes the html code of the web-page, and focuses specifically on detecting malicious code which may be injected in the web-page. The code centric module score process 400 compares the profile of malicious code by analyzing and generalizing from occurrences of malicious code, against the code of the web-page to identify suspicious code. The code centric module score process 400 includes processing any feedback received 407, and using the feedback to adjust analysis and update the threat score.

The code centric module score process 400 parses through the source code of the web page under consideration including advertisements displayed on the webpage, and identifies any malicious patterns and/or code in the web page. This is achieved by bootstrapping the module with signatures regarding malicious code behavior, appearance and other characteristics such as obfuscation, accessing of various resources or execution of some suspicious functions and others. The code centric module score process 400 can also analyze code, which the web page may be loading from a remote source or to which it might be pointing towards.

The present system, through the code centric module score process 400, also provides the capability to the web page administrator or owner to specify using a unique string, how pieces of code on the web page, code pointed to by the web page or loaded by the web page would function. If some code does not function according to what the owner or administrator has specified, this module can include this deviation in the behavior into the local threat score.

The code centric module 400 score process scans a website 401 and identifies web pages to be analyzed 402. The module score process 400 detects hyperlinks 403 (internal and external). In the case of internal hyperlinks, if it is a page the system wants to analyze, the system proceeds. (Note: the system may not analyze all the pages of a site given that there can be a limit on how many pages can be scanned). In the case of external hyperlinks, the reputation is checked with blacklists (e.g. Google DB). If the hyperlink exists in a blacklist, report to the user. The landing page (first page) may also be checked, without following links to other pages.

The module detects and analyzes code that can be found in (a) the webpage, (b) in web-objects within that page, and (c) websites pointed to by hyperlinks from the web page. The term web objects refers herein to all code and other elements of a web page, files embedded or linked from the page, the hyperlinks in the page, web advertisements in the page, and the web-objects found on the websites linked from the page and its advertisements.

The module analyzes the code within the web objects, including but not limited to JavaScriptNBscript (denoted js), pdf files, exe files, shockwave (swf) files, php files, and other computer language code.

The module detects web objects 404 (js, pdf, exe, rtf, swf, php). Each web-object, hyperlink, and linked website is checked 405 for whether it is malicious or not and the threat score is updated 406. Results are delivered to the decision logic module 204. Web-objects are checked 405 as described in FIG. 15 below.

Figure 5:
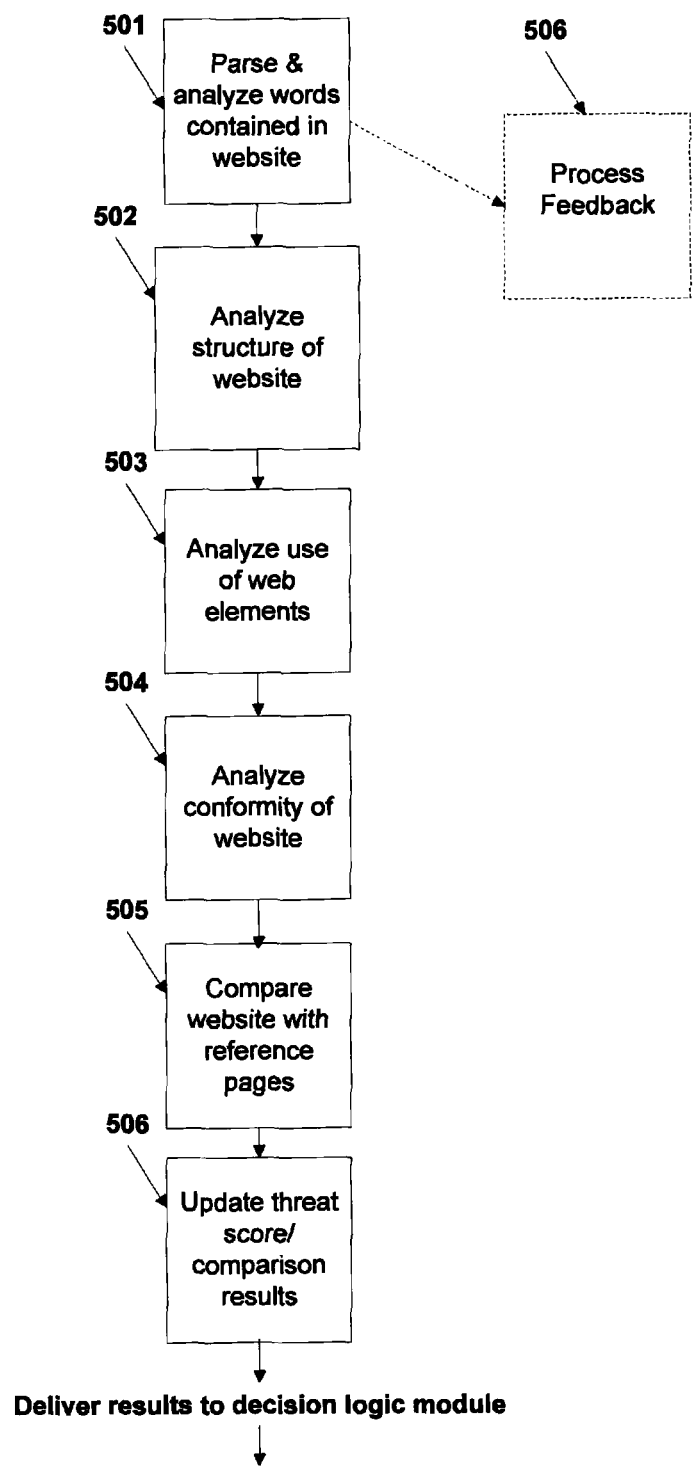
FIG. 5 illustrates an exemplary content module for use with the present system, according to one embodiment.

FIG. 5 illustrates an exemplary content module score process for use with the present system, according to one embodiment. A content module score process 500 analyzes the content of the web-pages of a website (recall that one website can involve more than one page, as mentioned earlier). Metrics here include but are not limited to: (a) text based metrics, such as keywords, and word frequency or writing style, (b) structural metrics, which refer to the layout and the way the page is put together, (c) page element metrics, which size and type of pictures, type of other media, such as flash animation, the presence of dynamic content, software involved in creating the web page etc.

The content module score process 500 parses and analyzes the keywords that are present on the web page 501 or email document in order to determine a threat score based on the occurrence of these words. The present system is bootstrapped with a list of keywords. The keywords may be selected from a freely available dictionary or can be stripped off from a sample set of websites. The keywords, if stripped off from websites can be obtained by parsing through the HTML code of the said web page. In fact, the keywords chosen can be sampled from a set of web sites which belong to different categories, such as financial sites, travel sites, technology sites, e-Commerce sites and more. Once we strip off keywords from these sample sites we can use this keyword set to analyze the content on suspicious sites. The following two methods are used.

Method 1: Compare the frequency of keywords found in a web page with a predefined and adaptive in time threshold. Compute the strength of the occurrence of each and groups of keywords using mathematical functions. Mathematical functions can also be used by the present system to compare the keyword characteristics for two different web pages in order to determine the level of similarity between them.

Method 2: Use a mathematical function to represent the keyword occurrences as a bit-vector. This is used to compare the characteristics of a suspicious web page with a predefined and tunable, with time, threshold. This mathematical function is used to compare the characteristics of suspicious web pages to others for computing similarity metrics. As a result the keywords appearing on a web page may be represented in a graphical form, either bipartite or some other form.

The content module score process 500 analyzes the structure of the webpage 502. This is achieved through standard techniques that compare the layout, the software and their versions that correspond to the webpage, and even design and style issues. Exact and approximate matching methods can be used. The content module score process 500 compares the structure of the suspect website with the structure of the initial site with the most similar URL. The structure of a page may be thought of as the series of HTML elements, links and tags in a web page. These provide a fingerprint of the page in question. Similarity between the structure of two web pages for the purposes of discriminating between them. Employing a mathematical function this module can compare the correlation, number and type of HTML tags on a suspect page with an initial page. This module can also compare a number of special characters present on the page, not limited to commas, exclamation marks and other such language related constructs. The content module score process 500 includes processing any feedback 506 received, and using the feedback to adjust analysis and update the threat score.

The content module score process 500 also checks if the web page in question conforms to the specifications 504 and norms as created by the World Wide Web Consortium (W3C). The errors or violations from this set benchmark are integrated into the mathematical functions that compute the threat score.

The content module score process 500 analyzes the use of web elements 503. It analyzes each element such as an image, script, audio or video files and other such objects. This module score process 500 calculates a threat score 506 based on the presence or absence of these elements in a suspected web page. The module score process 500 also compares the website with reference pages 505 and reports the comparison results 506. Comparison results can include how similar a website is to reference pages, or what reference pages are similar to the given website. As an example, the element analysis module can download the images present on a suspect site and compares the characteristics of these images with predefined criteria, which can be tuned with time according to various user inputs. The module can also calculate using a mathematical function the similarity between the images on a suspect site with images present on an initial site with the most similar website names. Image comparison can be done by identifying the format, size, statistical measures of pixel color and brightness information, contour extraction and by using other standard image processing techniques.

Each of these features is compared to obtain a similarity score for images. Any image on the suspect site is said to be similar to images on the initial site if a specified number of the above mentioned metrics match.

Note that the similarity in structure and across images can be also used to compare the similarity between two webpages. This module score process 500 can then compare each image on a suspect page with all images found on initial sites. Updated threat score results are reported to the decision logic module 204.

According to one embodiment, the content module can be used to provide guidance on branding. It is available for but not limited to the following operations:

Given a page, analyze its content and report a profile and statistics (e.g. how many words, what type of words according to existing categories, how many pictures).

Given two pages, compare them for similarity, to consider content and/or structural similarity.

Given a website name or page, and a reference set of website pages (explicitly given or implicitly defined) identify similar pages.

The implicit definition of the reference set is set in different ways, one of which is to contain all the websites whose names are similar to the original website name and are within k character modifications, where k is a parameter to be specified by the user. A character modification can be an addition, deletion or a substitution of a character by another. The sensitivity and thresholds on what constitutes similar pages is a user defined parameter.

Figure 6:
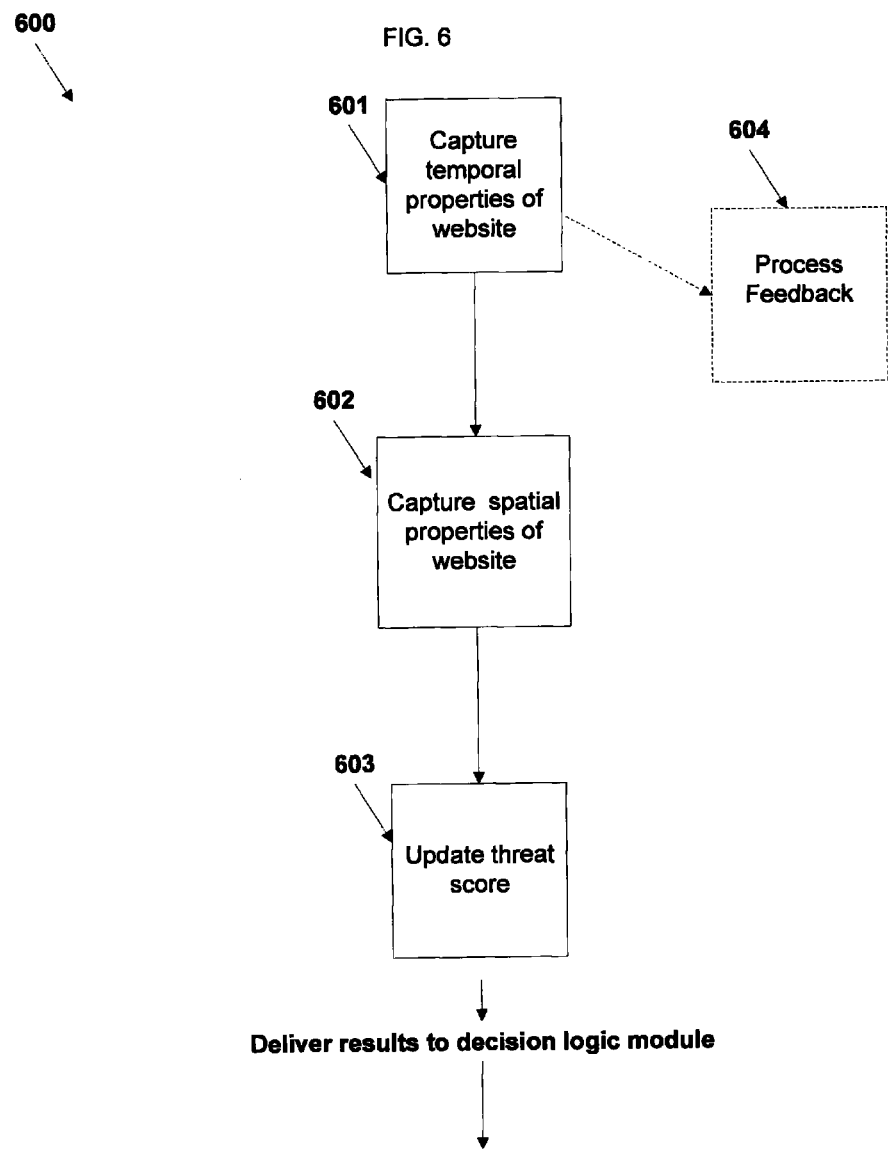
FIG. 6 illustrates an exemplary spatio-temporal module for use with the present system, according to one embodiment.

FIG. 6 illustrates an exemplary spatio-temporal module score process for use with the present system, according to one embodiment. A spatio-temporal module score process 600 captures temporal 601 and spatial 602 properties of a website. Spatial properties include but are not limited to: the geographical location of the machine that hosts the web page, and the location of the DNS server that handles the request for the IP address of that machine. The temporal properties include but are not limited to the web-site registration date, especially of the first time it was registered, the frequency with which its content is updated, the last time it was modified, its evolution in time (e.g. the size of the web-page over time etc).

The spatio-temporal module score process 600 also resolves an IP address associated with a website to a physical location. This can be achieved via standard IP Geo location services. We also identify where the mirrors of this site, if any, are placed. Mirrors are often placed for load balancing and handling large numbers of requests for content. Additionally, this module updates its threat score calculation according to a time-based and update-based machine learning algorithm.

The module updates its threat score 603 calculation according to any of the many machine learning algorithms (Bayesian Networks, Support Vector Machines, decisions trees, decision forest), which are trained on spatio-temporal profiles of a set of good and bad sites. The updated score is reported to the decision logic module 204. The spatio-temporal module score process 600 includes processing any feedback 604 received, and using the feedback to adjust analysis and update the threat score.

Figure 7:
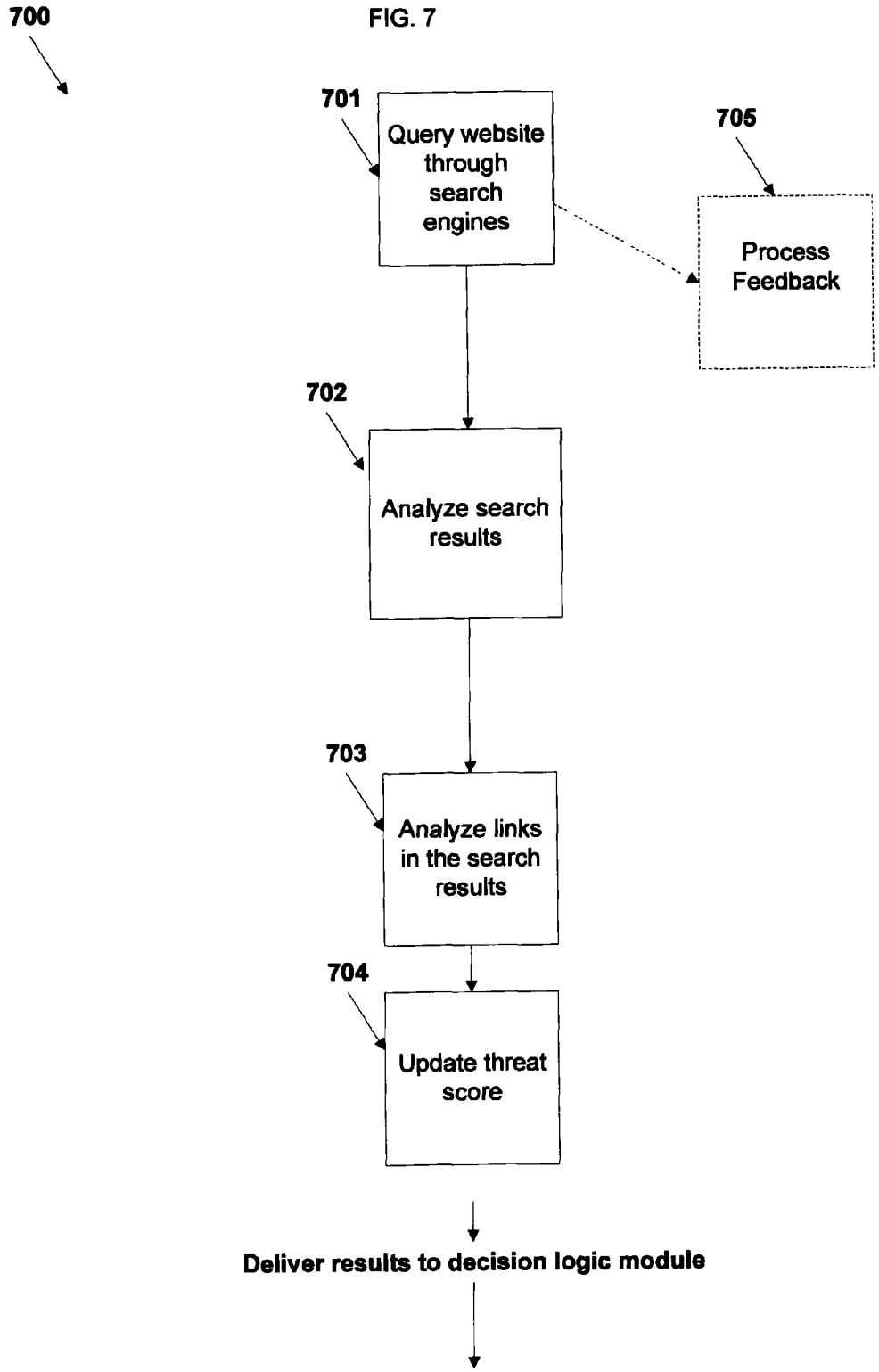
FIG. 7 illustrates an exemplary reputation and popularity module for use with the present system, according to one embodiment.

FIG. 7 illustrates an exemplary reputation and popularity module score process for use with the present system, according to one embodiment. A reputation and popularity module score process 700 collects and uses the collective belief and trust of the users and other web entities regarding the page. The reputation and popularity module score process 700 includes processing any feedback 705 received, and using the feedback to adjust analysis and update the threat score.

The reputation and popularity module score process 700 uses search engines that list popular sites higher in the results, blogs and opinion sites, and other "approval" methods (e.g. often opinion sites have a count of "how many people found this opinion useful"). In addition, this module score process 700 can use all other sources of information on the web, such as blogs, listings of popular and trusted sites. The module score process 700 uses an intelligent way to assess how trustworthy the source of information is, and this could be done with an adaptive machine learning and feedback mechanism.

The suspect website is queried through popular Internet search engines. 701. The returned search results are analyzed 702 for suggestions by the search engines that the suspect website is a variation of a well-known popular site website. If this is found, the threat score for the site is modified. The HTTP links in the search results to the suspect site are analyzed 703. The keywords and context of the search results, too, are included in modifying the threat score 704 of the site in question. All these three criterion can be combined using a weighted mathematical function or using a logical operator such as AND, OR, XOR, NOR. The resulting score is reported to the decision logic module 204.

Figure 8:
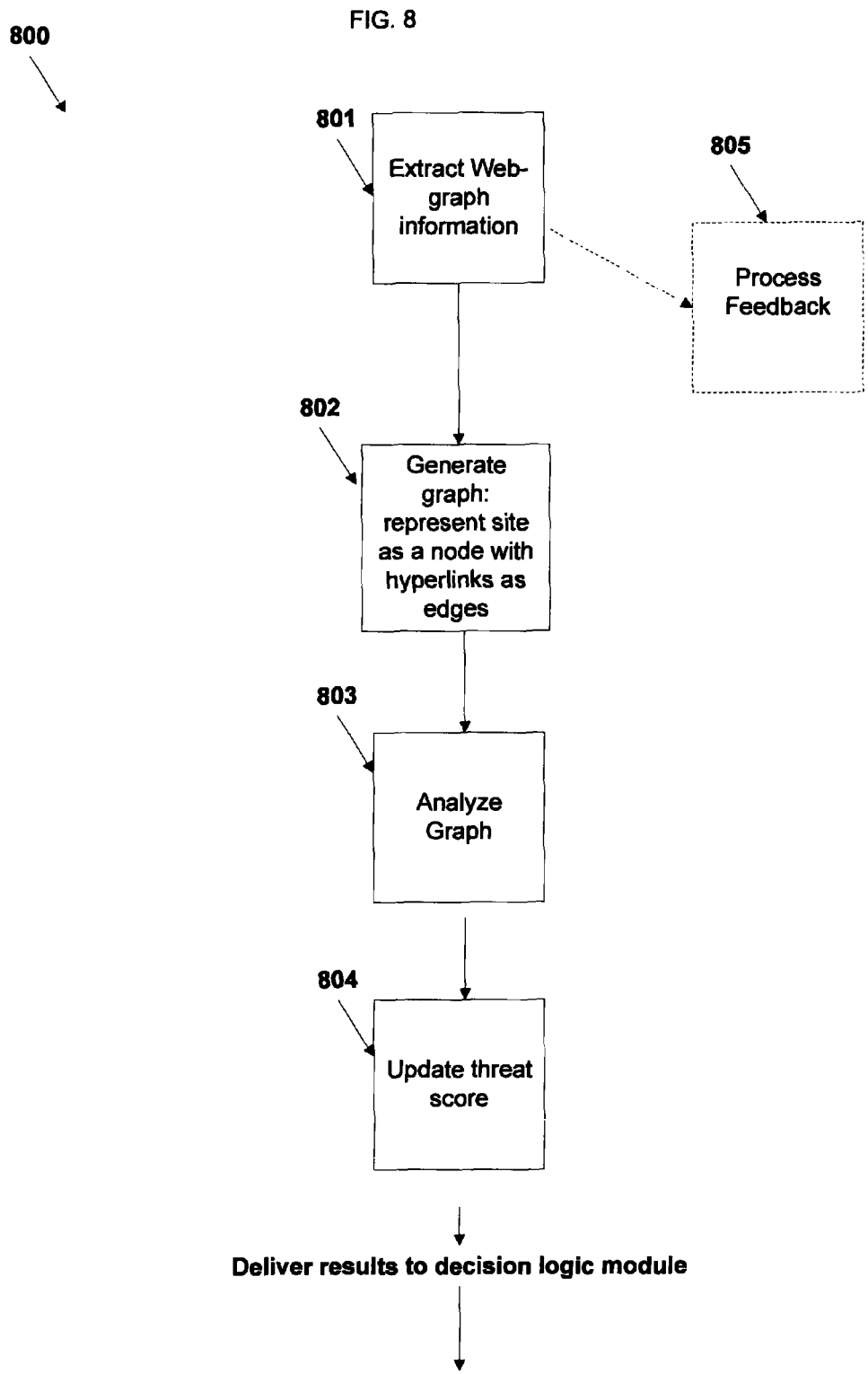
FIG. 8 illustrates an exemplary graph-based module for use with the present system, according to one embodiment.

FIG. 8 illustrates an exemplary graph-based module score process for use with the present system, according to one embodiment. A graph-based module score process 800 extracts information from a web-graph 801. A web-graph is a structure formed by web-pages as they point to each other. The module score process 800 analyzes the web-graph of a neighborhood of suspicious web-pages and identifies structure and strongly connected communities. A graph is generated by representing a web-site (or a web-page) as a node and the hyper-links between the sites as edges in the graph 802. The graph is analyzed 803 to calculate a threat score 804. The resulting score is reported back to the decision logic module. The graph module score process 800 includes processing any feedback 805 received, and using the feedback to adjust analysis and update the threat score.

According to one embodiment, such a graph based characterization is based on a multitude of features such as a mathematical function of the outdegree of nodes, a mathematical function of the indegree of nodes, a mathematical function of the outdegree of nodes and unique sites which are pointed to by a site in question, a mathematical function of the indegree of nodes and unique sites which point to the site in question. Standard graph metrics such as eccentricity, cliques, cut-sets and other important characteristics all figure in the calculation of the threat score.

The graph module score process 800 also uses well-known algorithms for identifying bi-partite cliques (loosely groups of sites that point to the same websites or are pointed to by the same websites).

Figure 9:
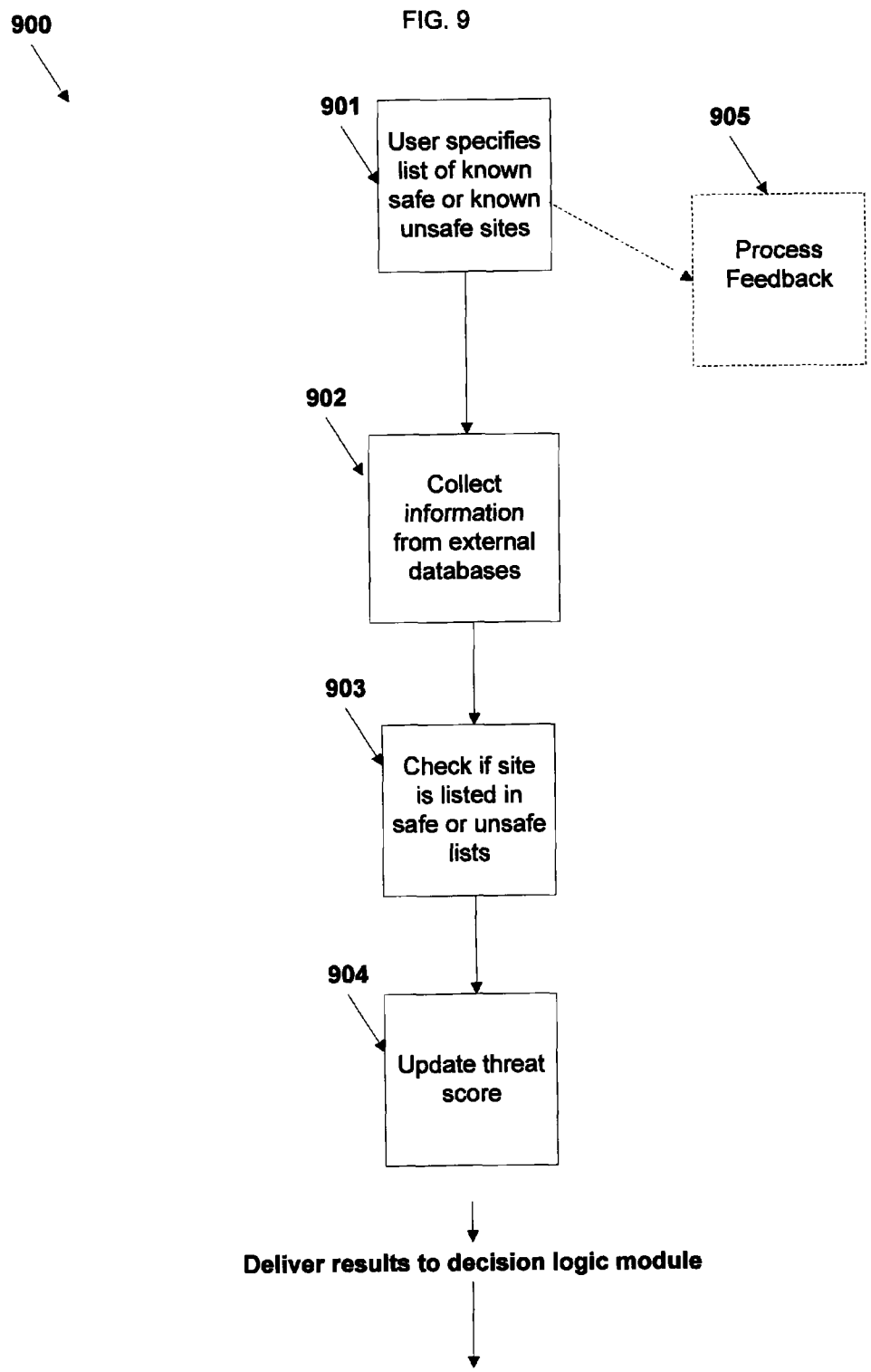
FIG. 9 illustrates an exemplary external-source module for use with the present system, according to one embodiment.

FIG. 9 illustrates an exemplary external-source module score process 900 for use with the present system, according to one embodiment. An external-source module collects and critically uses information from external classification sources, such as existing phishing databases.

The present system allows the user or an external database to specify sites and IP addresses for which warnings should not be generated. This list of sites and IPs are termed whitelists. The present system also includes the facility to allow the user to download blacklists from the Internet and integrate them with the software. For each of the IPs/sites listed in the blacklists a warning message can be generated. Blacklists can also be integrated by selecting such lists from a local network or from the local machine's hard drive. The Blacklists can consist of Phishing and other malicious sites and/or IPs of sites that are distributing malware or exploit browser vulnerabilities or are considered undesirable by the user. This module also has the capability to search for information related to a suspicious site on the Internet from various resources.

The present method includes also a component that carefully and critically assess the accuracy of external information through user feedback and other machine learning techniques.

A user specifies website names that are considered safe or unsafe 901. The present system also automatically collects information from external databases such as Google's, Yahoo's, Microsoft blacklists 902. The score process 900 checks if the website is listed in safe or unsafe lists and updates the threat score 903, 904. The results are delivered to the decision logic module 204. The external source module score process 900 includes processing any feedback 905 received, and using the feedback to adjust analysis and update the threat score.

According to one embodiment, if a website is both in a good list and a bad/blacklist, then a notification is sent to the operator of the system to resolve the conflict.

Figure 10:
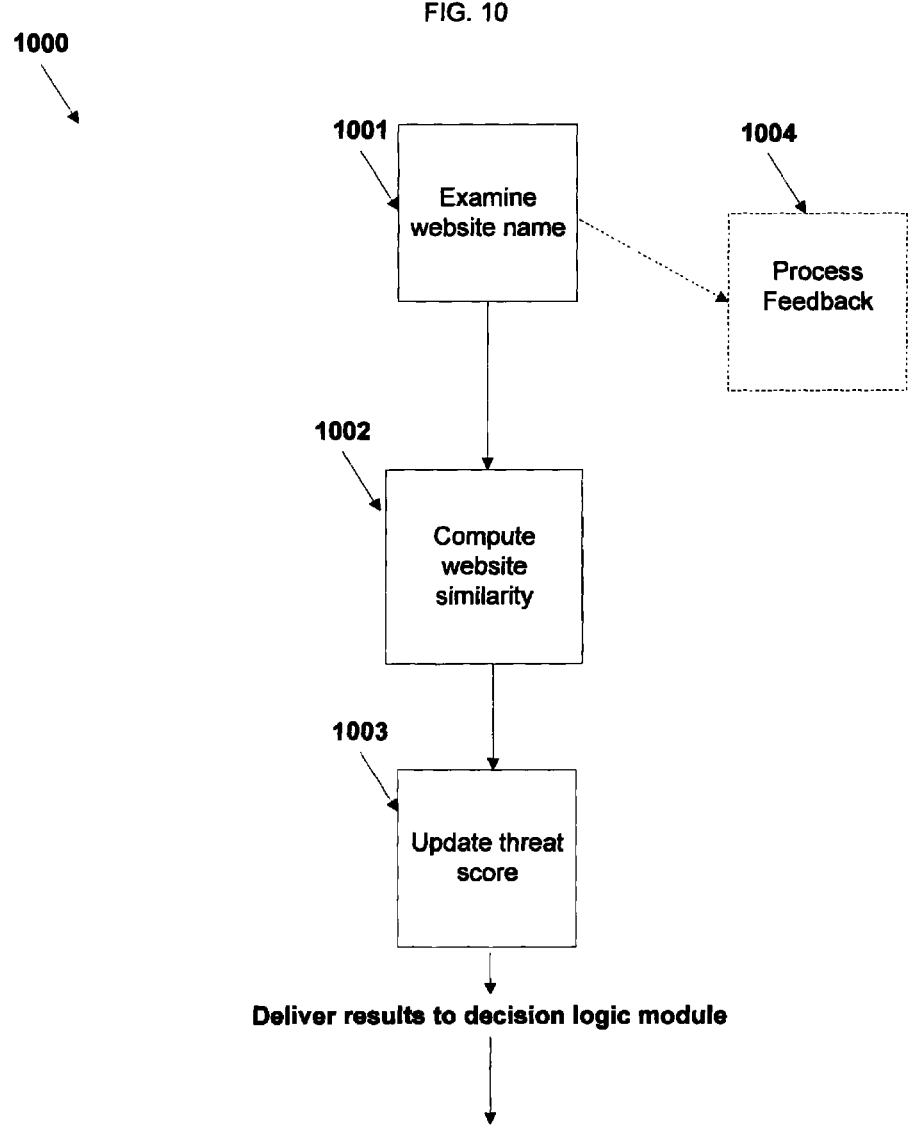
FIG. 10 illustrates an exemplary website name module for use with the present system, according to one embodiment.

FIG. 10 illustrates an exemplary website name module score process 1000 for use with the present system, according to one embodiment. The website name module score process 1000 examines the name of a website 1001 as a string and uses string comparisons, such as the "modification distance" between two strings, or the likelihood of a character replacing another when typing, or a comparison with the name of the entity (e.g. company) that owns the site.

The website name module score process 1000 computes the probability that a website which is entered by the user or is present as a link on a web page or email document is similar to a popular or frequently visited websites. Popular trusted sites are referred to herein as initial sites.

The module computes the similarity 1002 between the names of well known sites and the suspected name. The present system is aware of which initial websites should be compared with the suspect website. The present system extracts local web browser cache information to build a list of frequented websites with which it can compare suspect websites or the user can input a list of trusted websites that are integrated into the system. The present system maintains a list of initial websites which can be transferred to the client machine in order to bootstrap the process or can be present at a network server which can perform the website similarity calculation at a different location.

To compute the similarity among websites 1002 of an initial site and a suspect site the website name module examines the differences in spelling and length between the two website names. The difference of a character between the two names increases the local threat score by a mathematical function. Similarly, the difference in length among these names increases the difference threat score using a mathematical function. The higher the difference threat score, the more dissimilar the two websites are. The threat score is updated 1003 and reported to the decision logic module. The website name module score process 1000 includes processing any feedback 1004 received, and using the feedback to adjust analysis and update the threat score.

Figure 11:
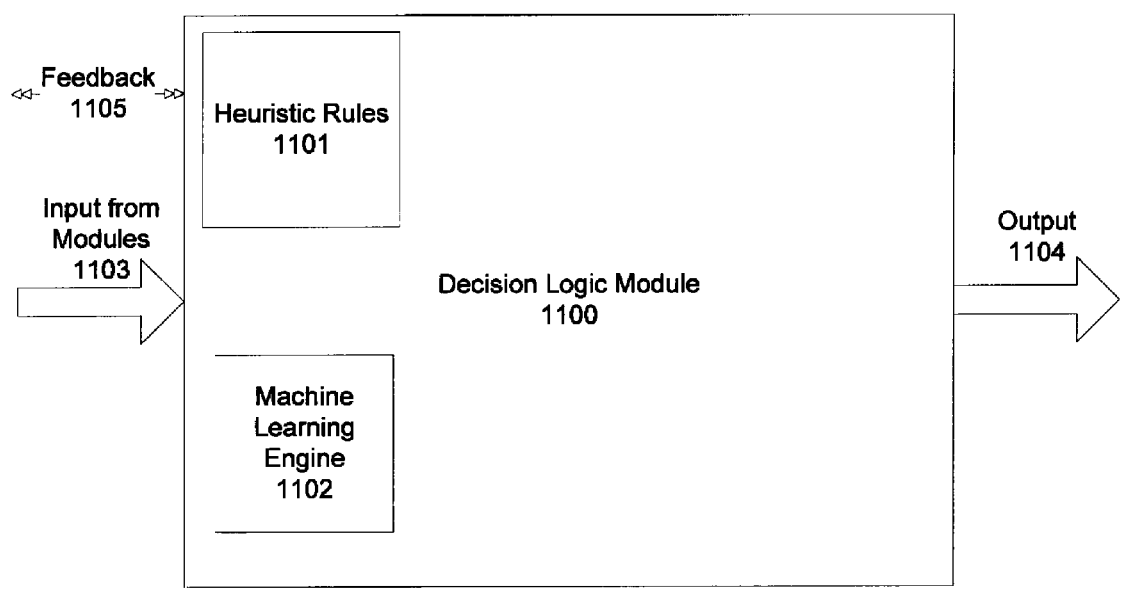
FIG. 11 illustrates an exemplary decision logic module for use with the present system, according to one embodiment.

FIG. 11 illustrates an exemplary decision logic module for use with the present system, according to one embodiment. A decision logic module 1100 includes heuristic rules 1101 specified by the user and a machine learning engine 1102. According to one embodiment, machine learning algorithms are used, specifically the "rotationforest" algorithm that investigates 51 parameters. According to another embodiment, the machine learning engine includes Bayesian networks, decision trees, support vector machines, and is trained on a set of good/bad sites, and then applied to the website in question.

According to one embodiment, a combination of heuristics are employed by examining keywords and strings that indicate that a script is good or bad.

The decision logic module 1100 receives input (scores and testimonies) from each module 1103. According to one embodiment, the decision logic module 1100 is implemented as a stand alone module. According to another embodiment, the decision logic module 1100 is implemented as a distributed module incorporated inside the other modules. According to another embodiment, the decision logic module 1100 is implemented as a combination of the foregoing (some logic within modules, but also a combined stand alone module).

The decision logic module 1100 provides and receives feedback 1105 to and from the user/operator through the interface. The module 1100 provides feedback to operator/user on what is reported and why it is reported. The module 1100 provides specific information of where malware appears on a site.

Feedback from the operator/user to the tool can include:
scripts can be labeled by operator/user and not reported in the future;
select scripts chosen by operator/user are put in training dataset; and
when the system labels a site or part of a site (e.g. piece of code on the site) as suspicious (e.g. not sure if it is good or bad) the operator/user are notified, and they can manually label the entity as good or bad. The system "learns" this and uses this information in the future.

Figure 12:
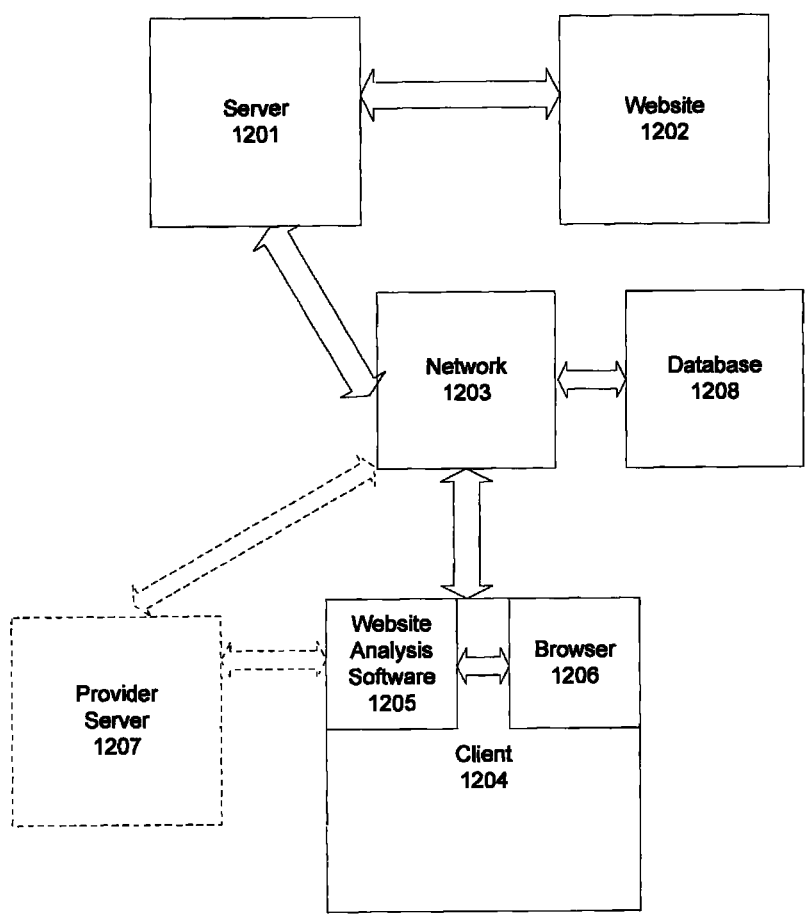
FIG. 12 illustrates exemplary system communication within the present system, according to one embodiment.

FIG. 12 illustrates exemplary system communication within the present system, according to one embodiment. An embodiment of the present system 1200 includes a server 1201 hosting a website 1202. The server 1201 is in communication with a network 1203. A database 1208 is in communication with the network. A client system 1204 is in communication with the network 1203 and includes website analysis software 1205 according to an embodiment of the present system in communication with a browser 1206. Optionally, a provider server 1207 having website analysis software can be in communication with the network 1203 and the client system 1204 having the website analysis software 1205. The servers 1201, 1207, and client 1204 systems have an architecture as described in FIG. 1 above, according to one embodiment.

Figure 13:
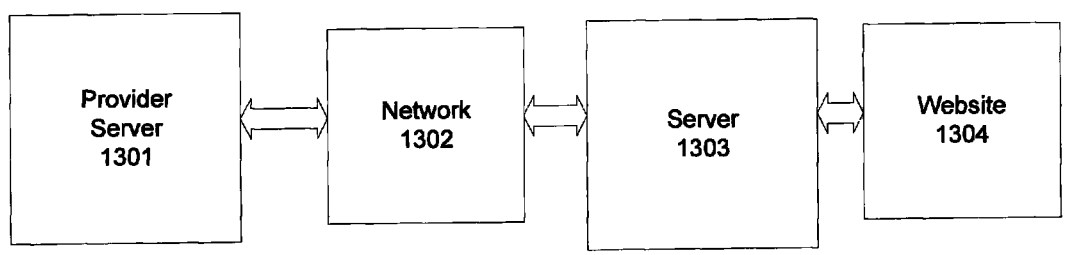
FIG. 13 illustrates exemplary software as a service system communication within the present system, according to one embodiment.

FIG. 13 illustrates exemplary software as a service system communication within the present system, according to one embodiment. An embodiment of the present system 1300 includes a provider server 1301 in communication with a network 1302. A server 1303 hosting a website 1304 is in communication with the network 1203. The provider server 1301 has website analysis software according to an embodiment of the present system, and receives input in the form of a URL. The servers 1301, 1303 have an architecture as described in FIG. 1 above, according to one embodiment.

Figure 14:
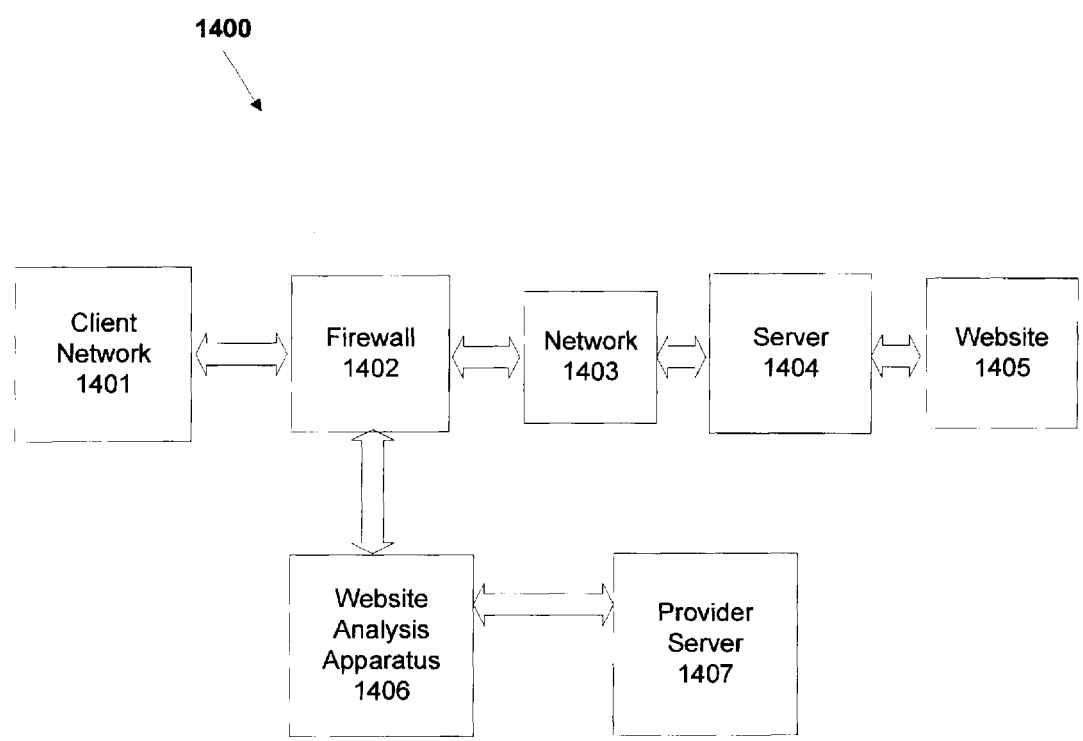
FIG. 14 illustrates exemplary appliance system communication within the present system, according to one embodiment.

FIG. 14 illustrates exemplary appliance system communication within the present system, according to one embodiment. An embodiment of the present system 1400 includes a client network 1401 in communication with a firewall 1402. The firewall 1402 is in communication with a network 1403, and a server 1404 hosting a website 1405 is in communication with the network 1403. The firewall 1402 is in communication with a website analysis apparatus 1406 according to one embodiment of the present system, and the website analysis apparatus 1406 is in communication with a provider server 1407. The website analysis apparatus 1406 and the provider server 1407 have website analysis software according to one embodiment of the present system. The servers 1404, 1407 have an architecture as described in FIG. 1 above, according to one embodiment.

Figure 15:
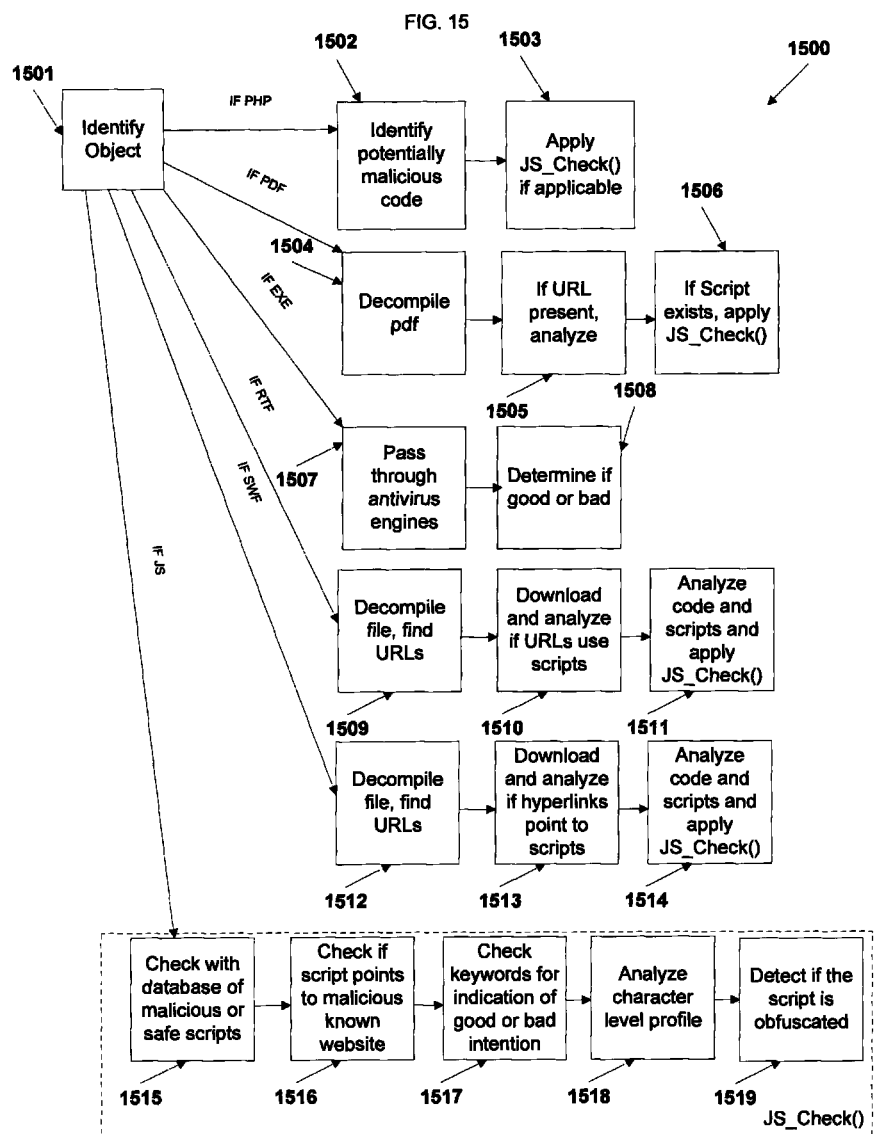
FIG. 15 illustrates an exemplary web object checking process within the present system, according to one embodiment.

FIG. 15 illustrates an exemplary web object checking process within the present system, according to one embodiment. A web object checking process 1500 as depicted in FIG. 4 above is impacted by any feedback processed prior to web object checking. The web object checking process 1500 includes identifying an object 1501. If the object is a "php" object, the process 1500 identifies potentially malicious code 1502 and applies the process JS_Check( )(as described below) if applicable 1503. If the object is a "pdf" object, the process 1500 decompiles the pdf 1504 and analyzes a URL if it is present 1505. If a script exists, JS_Check( ) is applied 1506.

If the object is an "exe" object, the process 1500 passes it through an antivirus engine 1507 and determines whether it is good or bad 1508. If the object is an rtf, the process 1500 decompiles the file and finds all the URLs in the file 1509. The process 1500 then downloads the URLs and analyses if the URLs use or point to scripts 1510, and then analyzes the code and scripts and applies JS_Check( ) when appropriate 1511.

If the object is an "swf" object (including swf objects embedded on a webpage, and those linked from, or transferred by an advertisement service) the process 1500 decompiles the file and finds all the URLs 1512. The process 1500 downloads and analyzes if any hyperlinks (term used interchangeably with URLs) point to scripts 1513, then analyzes the code and scripts and applies JS_Check( ) when appropriate 1514.

If the object is a JavaScript (js) object, then the process JS_Check( ) is applied. The object is checked against a database of malicious or safe scripts 1515, in a database maintained by the system and using external databases with such information, and the process 1500 checks if the script points to a known malicious website 1516, as determined by other functions of the system described herein. The process 1500 checks keywords (as defined above) for indication of good or bad intention 1517, including keywords that are commonly present in malicious scripts, analyzes the character level profile 1518, including the frequency of occurrences of characters, groups of characters, sequences of characters (possibly defined by regular expressions), and detects if the script is obfuscated 1518, including obfuscation by encoding formats (for example hexadecimal or octal encoding).

Web advertisements are included in the use of the term web objects herein. Web advertisements can be in the form of images or shockwave files and can contain hyperlinks. The present system analyzes web advertisements as described herein.

The present system is tunable and adaptive. It uses a variety of thresholds and parameters that are tunable. It can evolve using machine learning algorithms and user input over a period of time to continuously improve on the accuracy of the system and customize it to the needs of the user.

The user/operator can tune the operation of the present system on the following features:
how aggressively to report malware and alarms (parameters controlled at a high level by a sensitivity parameter (high, medium, low) or at a lower level (at the parameters of what constitutes a good, bad or suspicious webpage or part of webpage);
whether to report a suspicious event to operator and/or the user;
frequency of scanning of the website;
the number of modules to employ while scanning; and
the number of pages of the site to be scanned.

According to one embodiment, the present system can be tuned to check zero pages (only check the reputation of the site i.e. is it in Google blacklist). According to one embodiment, the present system can be tuned to check only the first ("landing") webpage. According to one embodiment, the present system can be tuned to check K pages selected in any way seem fit, i.e. by doing a breadth first search of the website pages.

A method and system for automated identification of phishing, phony, and malicious web sites have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method, comprising:
   receiving a first input, the first input including a universal resource locator (URL) for a webpage;
   receiving a second input, the second input including feedback information related to the webpage, the feedback information including an indication designating the webpage as safe or unsafe;
   receiving a third input from a database, the third input including reputation information related to the webpage, wherein the reputation information is based in part on where the webpage is listed in search results;
   extracting data from the webpage, the data comprising code associated with the webpage;
   processing the code associated with the webpage to detect a portion of the code that comprises malicious code injected into the webpage, wherein detecting the portion of the code that comprises the malicious code includes determining that the portion of the code does not function as defined by an owner of the webpage;
   analyzing a structure of the webpage by comparing the structure of the webpage with an initial structure of the webpage, wherein comparing the structure of the webpage to the initial structure of the webpage includes comparing a number of special characters present on the webpage with the initial structure of the webpage;
   in a computer system, calculating one or more intermediate threat scores for the webpage based on the feedback information, the reputation information, the code associated with the webpage including the potion of the code that comprises the malicious code injected into the webpage, and the structure of the webpage, wherein the structure of the webpage indicates a higher threat the more the structure of the webpage deviates from the initial structure of the webpage, and wherein the reputation information indicates a lower threat the higher the webpage is listed in the search results;
   determining a safety status for the webpage including whether the webpage is hazardous based on the one or more intermediate threat scores; and
   reporting the safety status for the webpage.

2. The computer-implemented method of claim 1, wherein calculating one or more intermediate threat scores comprises analyzing network data from the webpage to determine a number of redirections that a request associated with the webpage will undergo until the request is answered.

3. The computer-implemented method of claim 1, wherein calculating one or more intermediate threat scores comprises analyzing the code extracted from the webpage to determine if the code functions in a manner defined by a user.

4. The computer-implemented method of claim 1, wherein calculating one or more intermediate threat scores comprises analyzing content extracted from the webpage to determine if the webpage complies with web standards.

5. The computer-implemented method of claim 1, wherein calculating one or more intermediate threat scores comprises analyzing spatial and temporal property data extracted from the webpage, wherein the spatial property data comprises a geographical location of a machine that hosts the webpage and the temporal property data comprises a registration date associated with the webpage.

6. The computer-implemented method of claim 1, wherein calculating one or more intermediate threat scores comprises analyzing a reputation of the webpage based on a collective belief and trust of others regarding the webpage.

7. The computer-implemented method of claim 1, wherein calculating one or more intermediate threat scores comprises a graph analysis of the webpage, wherein the graph analysis comprises analyzing a web-graph of the webpage and other webpages that link to or are linked from the webpage to identify structure and strongly connected communities.

8. The computer-implemented method of claim 1, wherein calculating one or more intermediate threat scores comprises analyzing the third input.

9. The computer-implemented method of claim 1, wherein calculating one or more intermediate threat scores comprises analyzing name information related to the webpage to determine a similarity between a name of the webpage and names of other webpages.

10. The computer-implemented method of claim 1, further comprising identifying malicious computer code contained in the webpage.

11. The computer-implemented method of claim 1, further comprising identifying malicious computer code pointed to by the webpage.

12. The computer-implemented method of claim 1, wherein the extracted data is at least one of computer code, an embedded file, a linked file, a hyperlink, and a web advertisement.

13. A system, comprising:
    a server hosting a website in communication with a network;
    a database in communication with the network;
    a provider server in communication with the network; and
    a client system comprising a processor, the client system in communication with the network, the client system having software installed thereon, wherein the software is configured, when executed by the processor, to direct the client system to:
    receive a first input, the first input including a universal resource locator (URL) for a webpage;
    receive a second input, the second input including feedback information related to the webpage, the feedback information including an indication designating the webpage as safe or unsafe;
    receive a third input from the database, the third input including reputation information related to the webpage, wherein the reputation information is based in part on where the webpage is listed in search results;
    extract data from the webpage, the data comprising code associated with the webpage;
    process the code associated with the webpage to detect a portion of the code that comprises malicious code injected into the webpage, wherein detecting the portion of the code that comprises the malicious code includes determining that the portion of the code does not function as defined by an owner of the webpage;

analyze a structure of the webpage by comparing the structure of the webpage with an initial structure of the webpage, wherein comparing the structure of the webpage to the initial structure of the webpage includes comparing a number of special characters present on the webpage with the initial structure of the webpage;

calculate one or more intermediate threat scores for the webpage based on the feedback information, the reputation information, the code associated with the webpage including the potion of the code that comprises the malicious code injected into the webpage, and the structure of the webpage, wherein the structure of the webpage indicates a higher threat the more the structure of the webpage deviates from the initial structure of the webpage, and wherein the reputation information indicates a lower threat the higher the webpage is listed in the search results;

determine a safety status for the webpage including whether the webpage is hazardous based on the one or more intermediate threat scores; and report the safety status for the webpage.

14. The system of claim 13, wherein the software, to direct the client system to calculate one or more intermediate threat scores, directs the client system to analyze network data from the webpage to determine a number of redirections that a request associated with the webpage will undergo until the request is answered.

15. The system of claim 13, wherein the software, to direct the client system to calculate one or more intermediate threat scores, directs the client system to analyze the code extracted from the webpage to determine if the code functions in a manner defined by a user.

16. The system of claim 13, wherein the software, to direct the client system to calculate one or more intermediate threat scores, directs the client system to analyze content extracted from the webpage to determine if the webpage complies with web standards.

17. The system of claim 13, wherein the software, to direct the client system to calculate one or more intermediate threat scores, directs the client system to analyze spatial and temporal property data extracted from the webpage, wherein the spatial property data comprises a geographical location of a machine that hosts the webpage and the temporal property data comprises a registration date associated with the webpage.

18. The system of claim 13, wherein the software, to direct the client system to calculate one or more intermediate threat scores, directs the client system to analyze the reputation of the webpage based on a collective belief and trust of others regarding the webpage.

19. The system of claim 13, wherein the software, to direct the client system to calculate one or more intermediate threat scores, directs the client system to perform a graph analysis of the webpage, wherein the graph analysis comprises analyzing a web-graph of the webpage and other webpages that link to or are linked from the webpage to identify structure and strongly connected communities.

20. The system of claim 13, wherein the software, to direct the client system to calculate one or more intermediate threat scores, directs the client system to analyze the third input.

21. The system of claim 13, wherein the software, to direct the client system to calculate one or more intermediate threat scores, directs the client system to analyze name information related to the webpage to determine a similarity between a name of the webpage and names of other webpages.

22. The system of claim 13, further comprising the software configured to direct the client system to identify malicious computer code contained in the webpage.

23. The system of claim 13, further comprising the software configured to direct the client system to identify malicious computer code pointed to by the webpage.

24. The system of claim 13, wherein the extracted data is at least one of computer code, an embedded file, a linked file, a hyperlink, and a web advertisement.

25. The system of claim 13, further comprising a plurality of distributed provider servers in communication with the network.

* * * * *